July 4, 1939.    G. MEYER    2,165,001

PNEUMATIC CONTROL VALVE

Filed Sept. 26, 1938

Inventor:
Gustav Meyer
By Watson, Cole, Grindle & Watson
ATTYS

Patented July 4, 1939

2,165,001

UNITED STATES PATENT OFFICE 2,165,001

PNEUMATIC CONTROL VALVE

Gustav Meyer, Friedrichshafen-on-the-Bodensee, Germany, assignor to Maybach-Motorenbau Gesellschaft mit beschränkter Haftung, Friedrichshafen-on-the-Bodensee, Germany Application September 26, 1938, Serial No. 231,843
In Germany July 17, 1937

3 Claims. (Cl. 277—20)

The invention relates to a control valve device for the conduits of pneumatically operated devices, in particular on motor vehicles. For controlling the pressure medium in such conduits, two control members are often employed in order to prevent loss of pressure medium, one of said control members serving to shut off the pressure medium and the other for controlling the admission of outer air. These control members are connected together by draw gear and springs. The arrangements known heretofore require comparatively much room, a large number of details, springs and so forth, and are thereby complicated in construction, not very reliable in operation and expensive to manufacture.

The present invention provides a control device which is particularly advantageous on account of its simplicity, reliability in operation and low manufacturing costs, and which may be employed for one or more conduits of pressure medium operating devices. On account of its large cross-sections of aperture relatively to its size, the device provides in addition a particularly rapid admission to or discharge of air from the connected conduit or conduits and hence a quick action of the corresponding pneumatic device. These advantages also accrue particularly in the case of pneumatic devices wherein, such as for example in gear-shifting mechanism for change-speed gears, it is necessary to control the flow of pressure medium in a number of operating conduits at short intervals in succession or simultaneously.

According to the invention, the first of the cooperating control members provided for each conduit through which pressure medium is supplied to the pneumatic device is constructed at one of its ends as a pressure medium shut-off valve opposite a housing seat, and at its other end as a seat for the second control member controlling the admission of outer air. Expediently, the second control member, or valve head, is pivotally connected to the actuating lever gear for example by a ball joint. The first control member is advantageously provided with an axial bore.

The control device according to the invention is applicable to pressure and vacuum. It affords particular advanatages in case of pneumatic devices operated by vacuum, since in this case satisfactory self-sealing is provided in consequence of the suction on the second member.

Figure 1:
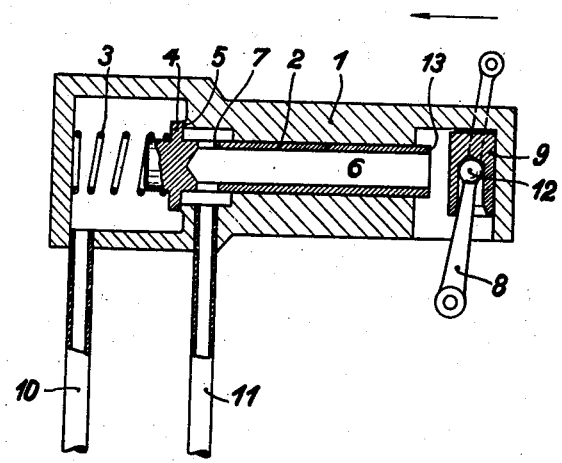
Figure 2:
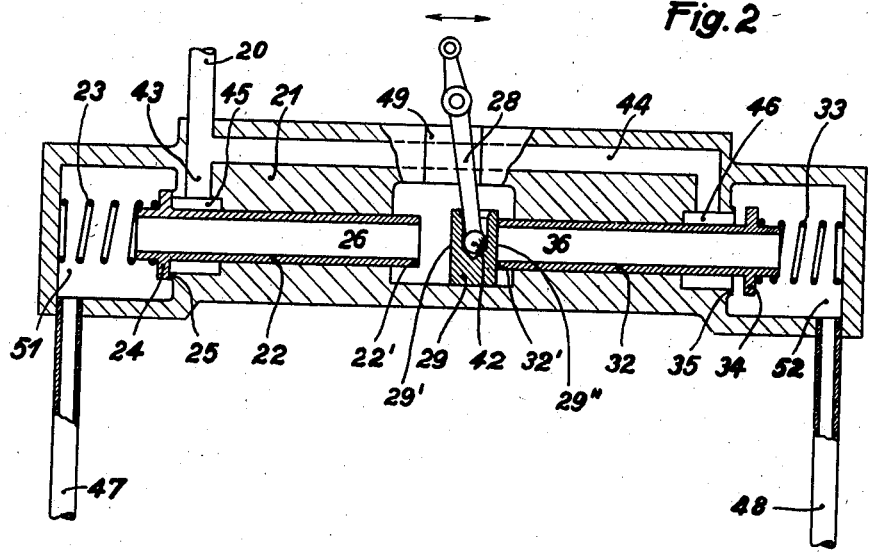

In the accompanying drawing, two constructions of the invention are shown diagrammatically in section by way of example. Figure 1 shows a simple construction having only one first and one second control member. Figure 2 reproduces a construction in which two first control members are arranged so that they are controlled alternately by a second control member common to both.

In Figure 1, at 1 is shown the housing of the control device, in which housing the first control member 2 is mounted for sliding. 3 is a spring pressing the control member 2 by its collar 4 against the housing seat 5. The control member 2 is provided with a longitudinal bore 6 and has a seat 13 and a plurality of transverse bores 7. 8 is the actuating member carrying the second control member or valve head 9 and connected to the latter for example by the ball joint 12. 10 is the supply conduit and 11 the conduit leading further to the operating device for a change-speed gear, clutch or the like.

In the position of the actuating member 8 in its right-hand end position shown in Figure 1, the path for the pressure medium supplied through the conduit 10 is blocked, the control member 2 being applied under the pressure of the spring 3 by its collar 4 against the valve seat 5. The conduit 11 is connected to the outer air by the transverse bores 7 and the longitudinal bore 6, as the valve head 9 uncovers the bore 6 in its right-hand end position. If the actuating member 8 is shifted to the left in the direction of the arrow shown on the drawing, the valve head 9, after travelling over the idle path, closes the longitudinal bore 6 by being applied to the valve seat 13, moves the control member 2 to the left, lifts the collar 4 off the seat 5 and allows the pressure medium to pass from the supply conduit 10 to the conduit 11, whence it passes to the operating device or other places of use. If vacuum is employed, then as soon as the valve head 9 is applied to the seating face 13 of the first control member 2 and the valve 4 is lifted off the seating face 5, a suction effect is exerted on the valve head 9, so that the latter is self-sealing.

In the construction shown in Figure 2, two control members 22 and 32 are mounted for sliding opposite one another in the housing 21 and are pressed by springs 23 and 33 with their collars 24 and 34 against the seats 25 and 35. The control member 22 possesses the longitudinal bore 26 extending over its entire length and the control member 32 the longitudinal bore 36, likewise extending over its entire length. 28 is the actuating member which by means of the ball joint 42 places the valve head 29 with the controlling faces 29' and 29'' alternately before the seating faces 22' and 32' of the control members 22 and 32, thereby moving the latter and hence lifting their collars 24 and 34 off the seats 25 and 35, the corresponding longitudinal bore 26 or 36 in each case being closed by the valve head 29. 20 is the supply conduit of the pressure medium which passes through the branch conduits 43 and 44 to the chambers 45 and 46. 47 and 48 are the conduits leading further to the respective places of use, for example to the cylinders of a pneumatic device, said cylinders being connected to the chambers 51 and 52. 49 is an opening in the housing.

In the position shown in Figure 2, the valve head 29 is applied with its seating face 29" against the seating face 32' of the control member 32, the collar 34 is lifted off the seat 35 and hence the passage from chamber 46 to chamber 52 is opened. Pressure medium supplied through the conduit 20 thereby passes through the branch conduit 44, chamber 46, chamber 52 to the conduit 48 and thence to the place of use. The seat 32' of the longitudinal bore 36 is closed by the controlling face 29". The conduit 47 is connected to the outer air through the bore 26 and opening 49 and is thereby relieved. The admission of pressure medium to the conduit 47 is blocked, since the collar 24 is applied to the seat 25 by the pressure of the spring 23.

If by means of the actuating member 28, the valve head 29 is shifted to the left, the pressure medium passes from the conduit 20 through the branch conduit 43 and chamber 45 to the chamber 51 and conduit 47 and thence to the corresponding place of use, while the conduit 48 is opened to the outer air.

The control member 2 with transverse bores shown in Figure 1 may likewise be employed for the double arrangement shown in Figure 2. In this case, the conduits 47 and 48 are employed as supply conduit for the pressure medium, while separate delivery conduits leading to the operating device are connected to the chambers 45 and 46.

The type of control member with throughgoing axial bore shown in Figure 2 may of course be also employed for a single arrangement of the kind shown in Figure 1.

I claim:

1. A control valve device for the conduits of pneumatically operated devices, comprising a hollow housing having two communicating chambers at each end thereof, a valve seat at the junction of each said pair of chambers, a passage extending from one chamber of each said pair of chambers to the atmosphere, pressure fluid conduits connected to said respective chambers, a control member slidably mounted in each said passage, each said control member having one end formed to provide a valve portion adapted to engage said corresponding valve seat and interrupt the communication between the chambers of said corresponding pair, said control members being arranged in opposing relation and having opposing ends adjacently arranged, yielding means normally urging each said valve portion against said corresponding valve seat, each said control member having an internal passage communicating with one chamber of said corresponding pair and extending to the opposite end of said member, a valve head arranged between the adjacent ends of said control members and means for selectively actuating said valve head to first engage the adjacent end of one of said control members and close said internal passage therein, and then to move said control member to disengage said valve portion from said valve seat.

2. A device according to claim 1, said internal passages in said control members extending from end to end thereof, respectively.

3. A device according to claim 1, said valve head being slidably supported in said housing and having a ball and socket connection with said actuating means.

GUSTAV MEYER.